(12) United States Patent
Sankaran et al.

(10) Patent No.: US 11,867,254 B2
(45) Date of Patent: Jan. 9, 2024

(54) PRESSURE RELIEF FOR A HYDRAULIC COMPRESSION STOP DEVICE

(71) Applicant: Tenneco Automotive Operating Company, Inc., Lake Forest, IL (US)

(72) Inventors: Shivanand Sankaran, Canton, MI (US); Wojciech Weglorz, Southfield, MI (US); Damian Slawik, Southfield, MI (US); Rafal Psota, Southfield, MI (US); Daniel Buczkowski, Southfield, MI (US); Thomas P. Mallin, Temperance, MI (US)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 489 days.

(21) Appl. No.: 17/119,157

(22) Filed: Dec. 11, 2020

(65) Prior Publication Data

US 2021/0123495 A1  Apr. 29, 2021

Related U.S. Application Data

(63) Continuation-in-part of application No. PCT/US2020/032438, filed on May 12, 2020.
(Continued)

(51) Int. Cl.
*F16F 9/49* (2006.01)
*F16F 9/18* (2006.01)
*F16F 9/34* (2006.01)

(52) U.S. Cl.
CPC ............... *F16F 9/49* (2013.01); *F16F 9/185* (2013.01); *F16F 9/34* (2013.01)

(58) Field of Classification Search
CPC ...... F16F 9/34; F16F 9/49; F16F 9/185; F16F 9/46
(Continued)

(56) References Cited

U.S. PATENT DOCUMENTS

| 2,729,308 A | 1/1956 | Koski et al. |
| 2,984,321 A | 5/1961 | Schultze |

(Continued)

FOREIGN PATENT DOCUMENTS

| CN | 105593565 A | 5/2016 |
| CN | 108006145 A | 5/2018 |

(Continued)

OTHER PUBLICATIONS

International Search Report and Written Opinion regarding International Application No. PCT/US2020/051721, dated Dec. 8, 2020.
(Continued)

*Primary Examiner* — Christopher P Schwartz
(74) *Attorney, Agent, or Firm* — Harness, Dickey & Pierce, P.L.C.

(57) ABSTRACT

A damper having a pressure tube, a piston, and a hydraulic compression stop assembly. The piston is arranged in sliding engagement inside the pressure tube. The piston divides the pressure tube into a first working chamber and a second working chamber and the piston is coupled to a piston rod that extends through the first working chamber. The hydraulic compression stop assembly is positioned in the second working chamber. The hydraulic compression stop assembly includes a sleeve, a plunger, a biasing member, and a pressure relief valve. The plunger is arranged in sliding engagement with the sleeve and can therefore move between an extended position and a retracted position. The biasing member biases the plunger towards the extended position and the pressure relief valve relieves excessive fluid pressure inside the hydraulic compression stop assembly.

20 Claims, 10 Drawing Sheets

Related U.S. Application Data

(60) Provisional application No. 62/846,928, filed on May 13, 2019.

(58) Field of Classification Search
USPC .......... 188/284, 286, 287, 288, 315, 322.13, 188/322.14, 322.22
See application file for complete search history.

(56) References Cited

U.S. PATENT DOCUMENTS

| | | | |
|---|---|---|---|
| 3,447,644 | A | 6/1969 | Duckett |
| 4,166,612 | A | 9/1979 | Freitag et al. |
| 4,457,498 | A | 7/1984 | Pauliukonis |
| 4,852,703 | A | 8/1989 | Nishimoto |
| 5,150,775 | A | 9/1992 | Charles et al. |
| 5,157,806 | A | 10/1992 | Wartian |
| 5,249,652 | A | 10/1993 | Leitzman et al. |
| 6,814,193 | B2 | 11/2004 | Grundei |
| 9,091,320 | B1 | 7/2015 | Smith et al. |
| 9,546,707 | B2 | 1/2017 | Kus et al. |
| 9,593,697 | B2 | 3/2017 | Baalmann et al. |
| 9,605,726 | B2 | 3/2017 | Baldoni et al. |
| 9,695,899 | B2 | 7/2017 | Smith et al. |
| 9,776,468 | B2 | 10/2017 | Teraoka et al. |
| 9,909,638 | B2 | 3/2018 | Chyla et al. |
| 9,982,738 | B2 * | 5/2018 | Lizarraga Senar ....... F16F 9/49 |
| 10,208,830 | B2 | 2/2019 | Bruno et al. |
| 10,876,591 | B2 | 12/2020 | Mallin et al. |
| 11,181,161 | B2 * | 11/2021 | Baldoni .................... F16F 9/19 |
| 2002/0056368 | A1 | 5/2002 | May |
| 2007/0114103 | A1 | 5/2007 | Born et al. |
| 2008/0053765 | A1 | 3/2008 | Tomonaga et al. |
| 2010/0059321 | A1 | 3/2010 | Boivin |
| 2012/0061194 | A1 | 3/2012 | Yu |
| 2014/0299426 | A1 | 10/2014 | Grzesik et al. |
| 2015/0090548 | A1 | 4/2015 | Yamanaka |
| 2015/0192187 | A1 | 7/2015 | Smith et al. |
| 2015/0247549 | A1 | 9/2015 | Takeno et al. |
| 2015/0276006 | A1 | 10/2015 | Smith et al. |
| 2016/0223045 | A1 | 8/2016 | Baldoni et al. |
| 2016/0230835 | A1 | 8/2016 | Groves et al. |
| 2017/0009840 | A1 | 1/2017 | Hertz |
| 2017/0328439 | A1 | 11/2017 | Flacht et al. |
| 2018/0058533 | A1 * | 3/2018 | Bruno .................... F16F 9/185 |
| 2018/0119770 | A1 | 5/2018 | Bruno et al. |
| 2018/0223942 | A1 | 8/2018 | Kus et al. |
| 2018/0355944 | A1 * | 12/2018 | Veltum .................. F16F 9/185 |
| 2020/0011395 | A1 | 1/2020 | Sankaran et al. |

FOREIGN PATENT DOCUMENTS

| | | |
|---|---|---|
| CN | 108291604 A | 7/2018 |
| DE | 3510866 C2 | 2/1989 |
| DE | 29910104 U1 | 7/2000 |
| DE | 102004008956 A1 | 9/2005 |
| DE | 102014223480 A1 | 5/2016 |
| DE | 102015121140 A1 | 6/2017 |
| EP | 2302252 B1 | 11/2012 |
| EP | 3384177 B1 | 10/2019 |
| FR | 2995048 B1 | 4/2015 |
| JP | 2016065626 A | 4/2016 |
| KR | 1020040024705 A | 3/2004 |
| KR | 20120058149 A | 6/2012 |
| WO | WO-2014/037661 A1 | 3/2014 |
| WO | WO-2014137661 A1 | 9/2014 |
| WO | WO-2017001675 A1 | 1/2017 |
| WO | WO-2018155339 A1 | 8/2018 |

OTHER PUBLICATIONS

International Search Report for corresponding case PCT/US2020/032438, dated Aug. 13, 2020.

Written Opinion for corresponding case PCT/US2020/032438, dated Aug. 13, 2020.

First Office Action from corresponding Chinese application No. 202080035901 dated Nov. 15, 2022.

First Search report from corresponding Chinese application No. 202080035901 dated Nov. 15, 2022.

\* cited by examiner

PRESSURE RELIEF FOR A HYDRAULIC COMPRESSION STOP DEVICE

CROSS REFERENCE TO RELATED APPLICATIONS

This application is a continuation-in-part of International Patent Application No. PCT/US2020/032438, filed on May 12, 2020; which claims priority to U.S. Provisional Application No. 62/846,928, filed May 13, 2019. The entire disclosure of the applications referenced above are incorporated herein by reference.

FIELD

The present disclosure relates generally to dampers for vehicle suspension systems and more particularly to dampers with hydraulic compression stops.

BACKGROUND

The statements in this section merely provide background information related to the present disclosure and may not constitute prior art.

In general, dampers are used to absorb and dissipate the impact and rebound movement of a vehicle's suspension system and keep the vehicle's tires in contact with the ground. Dampers are typically installed alongside a spring (as a stand-alone shock absorber) or inside a spring (as part of a coil-over shock and strut assembly) and placed in front and rear suspension systems. The damper is attached to a frame member or other sprung component of the vehicle by an upper mount and is attached to a suspension member or other unsprung component of the suspension by a lower mount.

Conventional hydraulic dampers include a pressure tube, which acts as a hydraulic cylinder. A piston is slidably disposed within the pressure tube with the piston separating the interior of the pressure tube into two fluid chambers. A piston rod is connected to the piston and extends out of one end of the pressure tube where it is adapted for attachment to a sprung or unsprung component of the vehicle. The opposite end of the pressure tube is adapted for attachment to the other sprung or unsprung component of the vehicle. A first valving system, typically incorporated within the piston, functions to create a damping load during the damper's extension (i.e., rebound stroke). A second valving system, typically incorporated within the piston in a mono-tube damper and in a base valve assembly in a dual-tube damper, functions to create a damping force during the damper's compression stroke.

Many hydraulic dampers include features designed to prevent the piston and piston rod from coming to an abrupt stop at the end of a compression stroke. In some instances, a simple bumper is used to cushion the piston and the piston rod when they reach the end of a compression stroke. More sophisticated compression stops have been developed that utilize a hydraulic plunger to slow the movement of the piston and the piston rod at the end of a compression stroke by increasing (i.e., ramping up) the damping force acting on the piston. Adding a hydraulic compression stop to a passive damper typically requires significant changes or modifications to the structure of the damper and to manufacturing and assembly processes. Accordingly, there remains a need for improved hydraulic compression stops that can be more easily incorporated into existing passive damper designs without requiring significant changes or modifications to the damper. There also remains a need for hydraulic compression stops with improved noise, vibration, and harshness (NVH) performance compared to existing designs.

SUMMARY

This section provides a general summary of the disclosure, and is not a comprehensive disclosure of its full scope or all of its features.

In accordance with one aspect of the present disclosure, a damper having a pressure tube, a piston, and a hydraulic compression stop assembly is provided. The pressure tube extends annularly about a damper axis and longitudinally between a first pressure tube end and a second pressure tube end. The piston is arranged in sliding engagement inside the pressure tube. The piston divides the pressure tube into a first working chamber and a second working chamber and the piston is coupled to a piston rod that extends through the first working chamber. The hydraulic compression stop assembly is positioned in the second working chamber. The hydraulic compression stop assembly includes a sleeve, a plunger, and a biasing member. The plunger is arranged in sliding engagement with the sleeve and can therefore move (i.e., slide) between an extended position and a retracted position. The biasing member biases the plunger towards the extended position.

The hydraulic compression stop assembly extends longitudinally between a first assembly end and a second assembly end. The second assembly end is positioned adjacent to the second pressure tube end. The plunger of the hydraulic compression stop assembly extends longitudinally between a first plunger end and a second plunger end. The first plunger end is configured to contact the piston and/or the piston rod at the end of a compression stroke of the damper. The second plunger end is arranged in sliding engagement inside the sleeve. Together, the sleeve and the plunger of the damper cooperate to define a hydraulic chamber inside the hydraulic compression stop assembly. The positive preload on the biasing member is advantageous because it provides for a more gradual increase in damping force when the piston and/or piston rod first contacts the plunger and begins to move the plunger from the extended position towards the retracted position.

A pressure relief valve is located at the second assembly end of the hydraulic compression stop assembly. The pressure relief valve is positioned to open and close one or more pressure relief passageways that are constructed to communicate fluid from the hydraulic chamber inside the hydraulic compression stop assembly to the second working chamber when fluid pressure inside the hydraulic chamber exceeds a pre-determined threshold pressure. The pressure relief valve helps prevent damage to the hydraulic compression stop assembly due to excessive internal pressure which may result in the hydraulic chamber of the hydraulic compression stop assembly during high rod speed events. Such excessive internal pressures can arise because the hydraulic compression stop assembly is designed to create a fixed-area flow restriction, so the pressure inside the hydraulic chamber of the hydraulic compression stop assembly continuously increases with the flow rate squared. By limiting the peak pressure inside the hydraulic chamber of the hydraulic compression stop assembly, the addition of the pressure relief valve allows the hydraulic compression stop assembly to be tuned to improve ride performance and quality during low and moderate rod speed events while not breaking during high rod speed events. The pressure relief valve also allows for the hydraulic compression stop assembly to be economically made, such as from relatively thin-walled plastic materials without risk of structural failure.

In accordance with another aspect of the present disclosure, the plunger of the hydraulic compression stop assembly includes a bumper cavity at the first plunger end that receives a bumper. The bumper is made of a compliant material and is configured to come into contact with and cushion the piston and/or the piston rod when the damper reaches the end of a compression stroke. The bumper cavity includes a side wall and the bumper has an outer circumferential surface that abuts the side wall of the bumper cavity. When the bumper is in an uncompressed state (i.e., before the bumper is pressed into the bumper cavity), the outer circumferential surface of the bumper is arranged at a non-parallel angle relative to the side wall of the bumper cavity. This geometry of the bumper creates radial compression in the compliant material of the bumper and an interference fit between the outer circumferential surface of the bumper and the side wall of the bumper cavity when the bumper is pressed into the bumper cavity. This feature helps retain the bumper in the bumper cavity and prevents movement of the bumper relative to the side wall of the bumper cavity during movement of the piston within the pressure tube during operation of the damper, particularly during rebound strokes.

Together, these features provide for a hydraulic compression stop assembly that can easily be incorporated into an existing passive damper without significant changes or modifications. These features also provide improved noise, vibration, and harshness (NVH) performance over traditional compression stop designs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
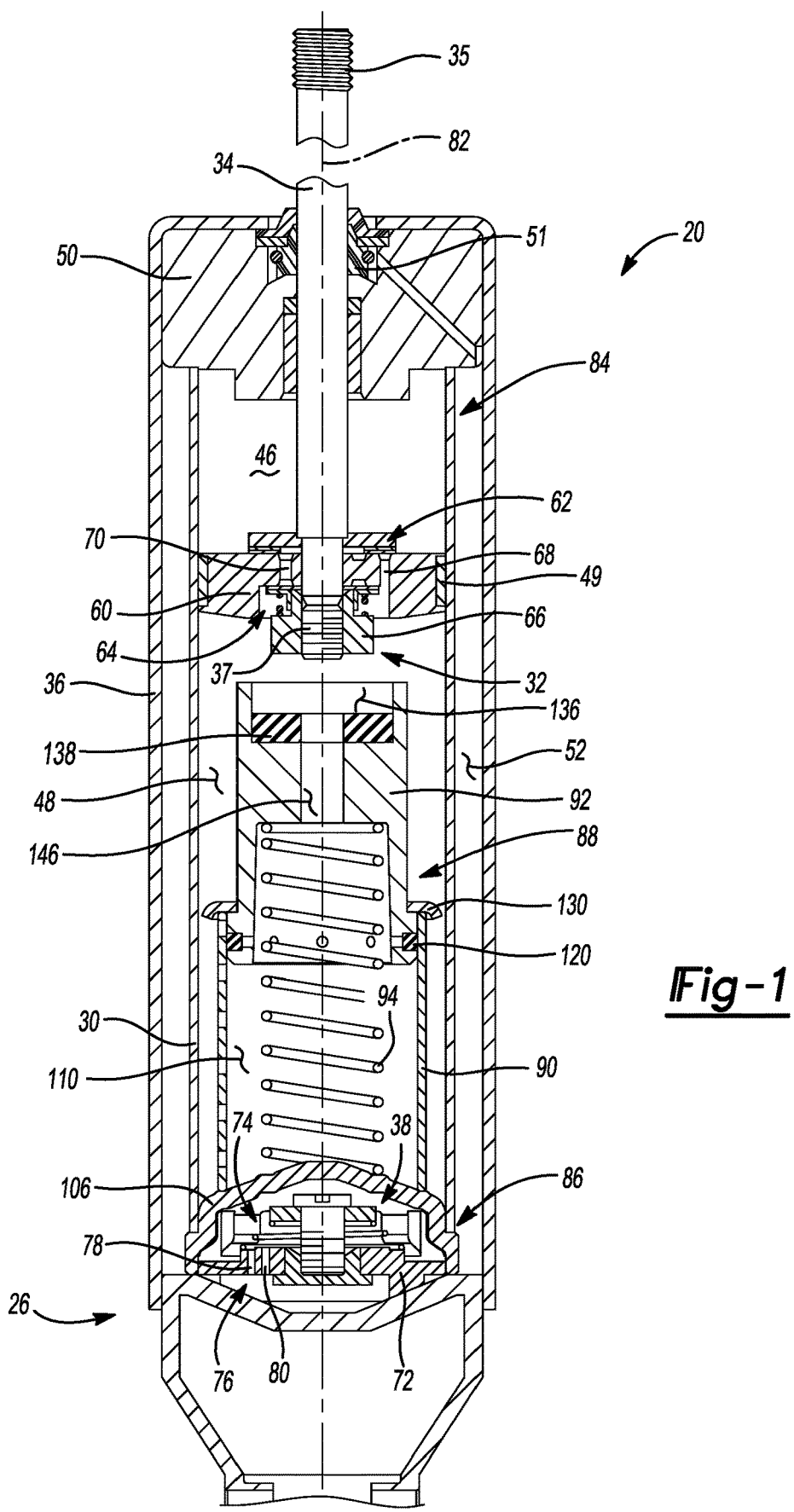
FIG. 1 is a side cross-sectional view of an exemplary damper with a hydraulic compression stop assembly that has been constructed in accordance with the teachings of the present disclosure.

Referring to the Figures, wherein like numerals indicate corresponding parts throughout the several views, a damper 20 is illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, the damper 20 includes a pressure tube 30, a piston 32, a piston rod 34, and optionally, a reserve tube 36 and a base valve assembly 38. The piston 32 is slidably disposed within the pressure tube 30 and divides the pressure tube 30 into a first working chamber 46 and a second working chamber 48. A seal 49 is disposed between the piston 32 and the pressure tube 30 to permit sliding movement of the piston 32 with respect to the pressure tube 30 without generating undue frictional forces as well as sealing the first working chamber 46 from the second working chamber 48. The piston rod 34 extends between a first piston rod end 35 and a second piston rod end 37. The second piston rod end 37 is attached (i.e., coupled) to the piston 32. The piston rod 34 extends through the first working chamber 46 and through a rod guide assembly 50. Accordingly, the first piston rod end 35 is always positioned outside the pressure tube 30. A seal assembly 51 seals the interface between the rod guide assembly 50 and the piston rod 34.

The first piston rod end 35 is adapted to be secured to either a sprung or unsprung component of a vehicle (not shown). Because the piston rod 34 extends only through the first working chamber 46 and not the second working chamber 48, extension and compression movements of the piston 32 with respect to the pressure tube 30 causes a difference in the amount of fluid displaced in the first working chamber 46 compared to the amount of fluid displaced in the second working chamber 48. The difference in the amount of fluid displaced is known as the "rod volume" and during extension movements it flows through the base valve assembly 38. During a compression movement of the piston 32 with respect to the pressure tube 30, valving 62 within the piston 32 allows fluid to flow from the second working chamber 48 to the first working chamber 46 while the "rod volume" of fluid flow flows through the base valve assembly 38.

The base valve assembly 38 is positioned at a base end 26 of the damper 20 which is adapted to be secured to either a sprung or unsprung component of the vehicle (not shown) and controls the flow of fluid between the second working chamber 48 and a reservoir chamber 52 positioned radially between the pressure tube 30 and the reserve tube 36. When the damper 20 extends in length, an additional volume of fluid is needed in the second working chamber 48 due to the rod volume and fluid will flow from the reservoir chamber 52 to the second working chamber 48 through the base valve assembly 38. When the damper 20 compresses in length, an excess of fluid must be removed from the second working chamber 48 due to the rod volume. Thus, fluid will flow from the second working chamber 48 to the reservoir chamber 52 through the base valve assembly 38.

The piston 32 comprises a piston body 60, a first compression valve assembly 62, a first extension valve assembly 64, and a nut 66. The nut 66 is threaded onto the second piston rod end 37 to secure the first compression valve assembly 62, the piston body 60, and the first extension valve assembly 64 to the piston rod 34. The piston body 60 defines a first plurality of compression passages 68 and a first plurality of extension passages 70. The base valve assembly 38 comprises a valve body 72, a second extension valve assembly 74, and a second compression valve assembly 76. The valve body 72 defines a second plurality of extension passages 78 and a second plurality of compression passages 80.

During a compression stroke, fluid in the second working chamber 48 is pressurized causing fluid pressure to react against the first compression valve assembly 62. The first compression valve assembly 62 therefore acts as a check valve between the second working chamber 48 and the first working chamber 46. The damping characteristics of the damper 20 during a compression stroke can also be controlled by the base valve assembly 38. The second compression valve assembly 76 controls the flow of fluid from the second working chamber 48 to the reservoir chamber 52 during a compression stroke. The second compression valve assembly 76 can be designed as a safety hydraulic relief valve, a damping valve, or the second compression valve assembly 76 can be removed altogether from the base valve assembly 38.

During an extension stroke, the first plurality of compression passages 68 are closed by the first compression valve assembly 62 and fluid in the first working chamber 46 is pressurized causing fluid pressure to react against the first extension valve assembly 64. The first extension valve assembly 64 is designed as either a safety hydraulic relief valve, which will open when the fluid pressure within the first working chamber 46 exceeds a predetermined limit, or as a pressure valve working to change the shape of the damping curve. The damping characteristics of the damper 20 during an extension stroke can be controlled by the first extension valve assembly 64. Replacement flow of fluid into the second working chamber 48 during an extension stroke flows through the base valve assembly 38. Fluid in the second working chamber 48 is reduced in pressure causing fluid in the reservoir chamber 52 to flow to the second working chamber 48 through the second plurality of extension passages 78. The second extension valve assembly 74 therefore acts as a check valve between the reservoir chamber 52 and the second working chamber 48. The damping characteristics of the damper 20 during an extension stroke can be controlled by the first extension valve assembly 64.

Although a dual-tube damper 20 is illustrated in FIG. 1, it should be appreciated that the subject disclosure is equally applicable to mono-tube dampers. Such mono-tube dampers lack the reserve tube 36 and the base valve assembly 38 shown in FIG. 1.

The pressure tube 30 has a cylindrical shape, which extends annularly about a damper axis 82 and longitudinally between a first pressure tube end 84 and a second pressure tube end 86. The first pressure tube end 84 mates with the rod guide assembly 50 and the base valve assembly 38 is positioned in the second pressure tube end 86. It should be appreciated that when the terms "longitudinal" and "longitudinally" are used herein, they are meant to describe structures, dimensions, directions, or movements that are substantially parallel to the damper axis 82.

Figure 2:
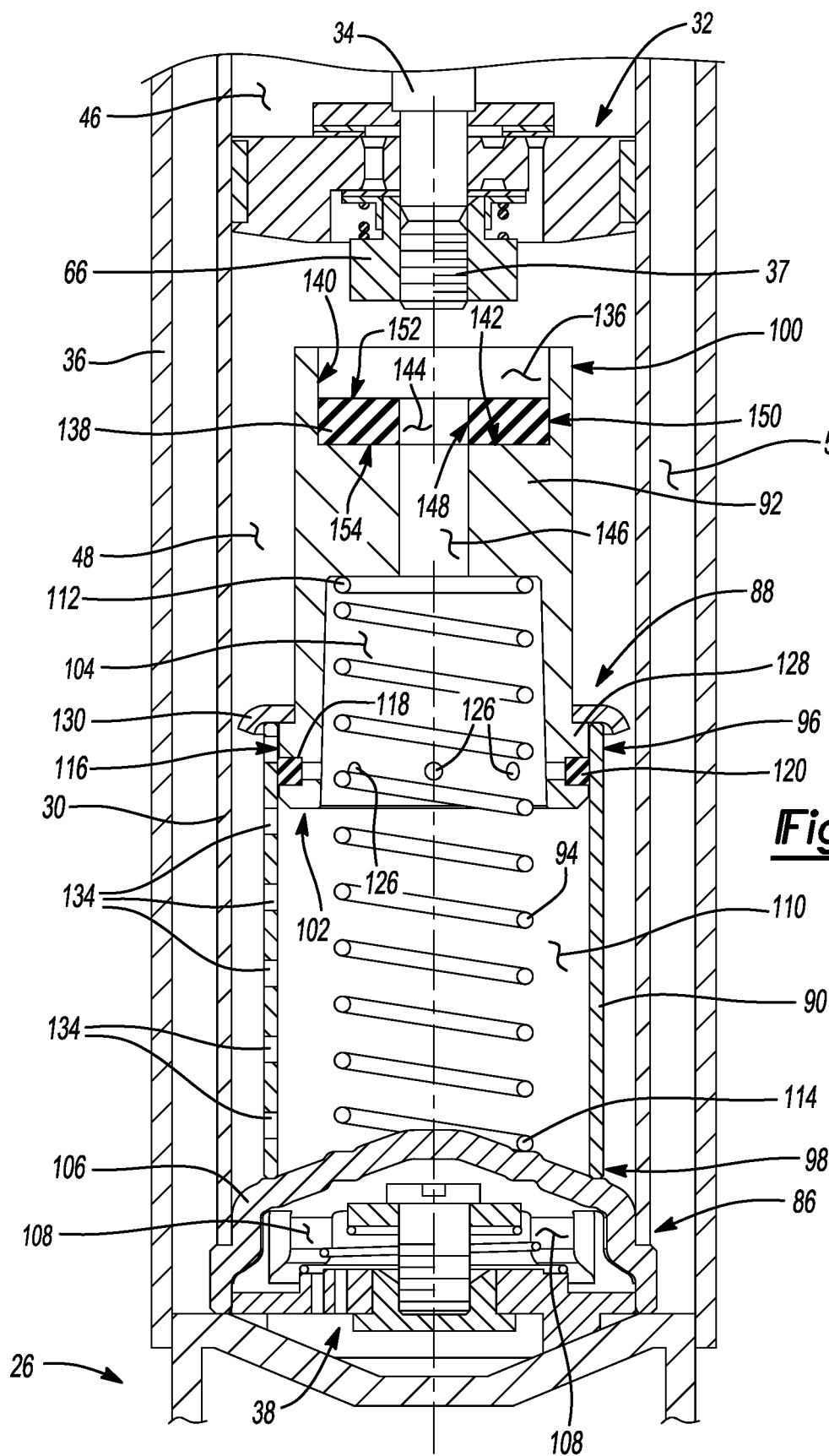
FIG. 2 is an enlarged side cross-sectional view of a portion of the exemplary damper illustrated in FIG. 1.
Figure 3:
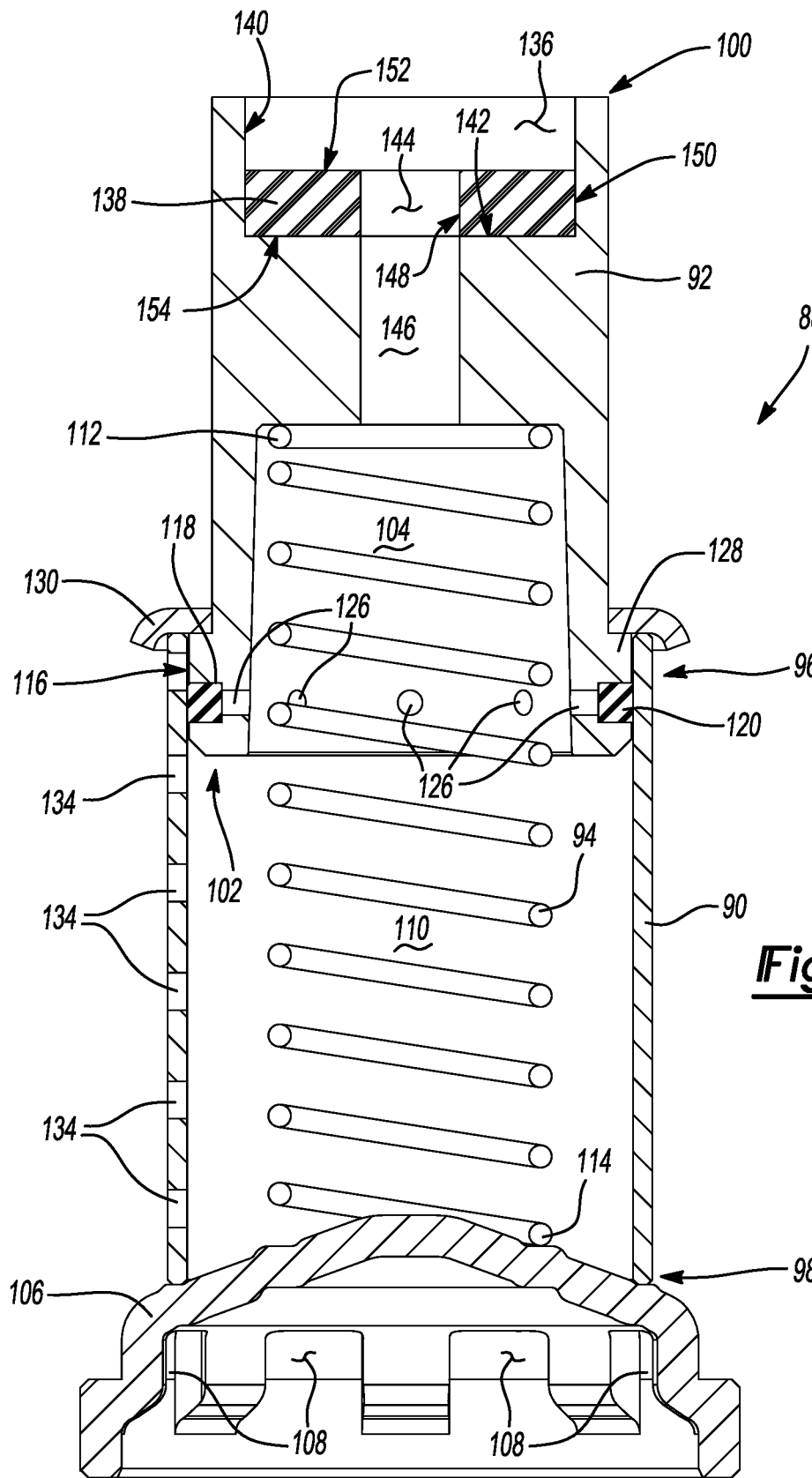
FIG. 3 is an enlarged side cross-sectional view of the hydraulic compression stop assembly of the exemplary damper illustrated in FIG. 1.
Figure 4:
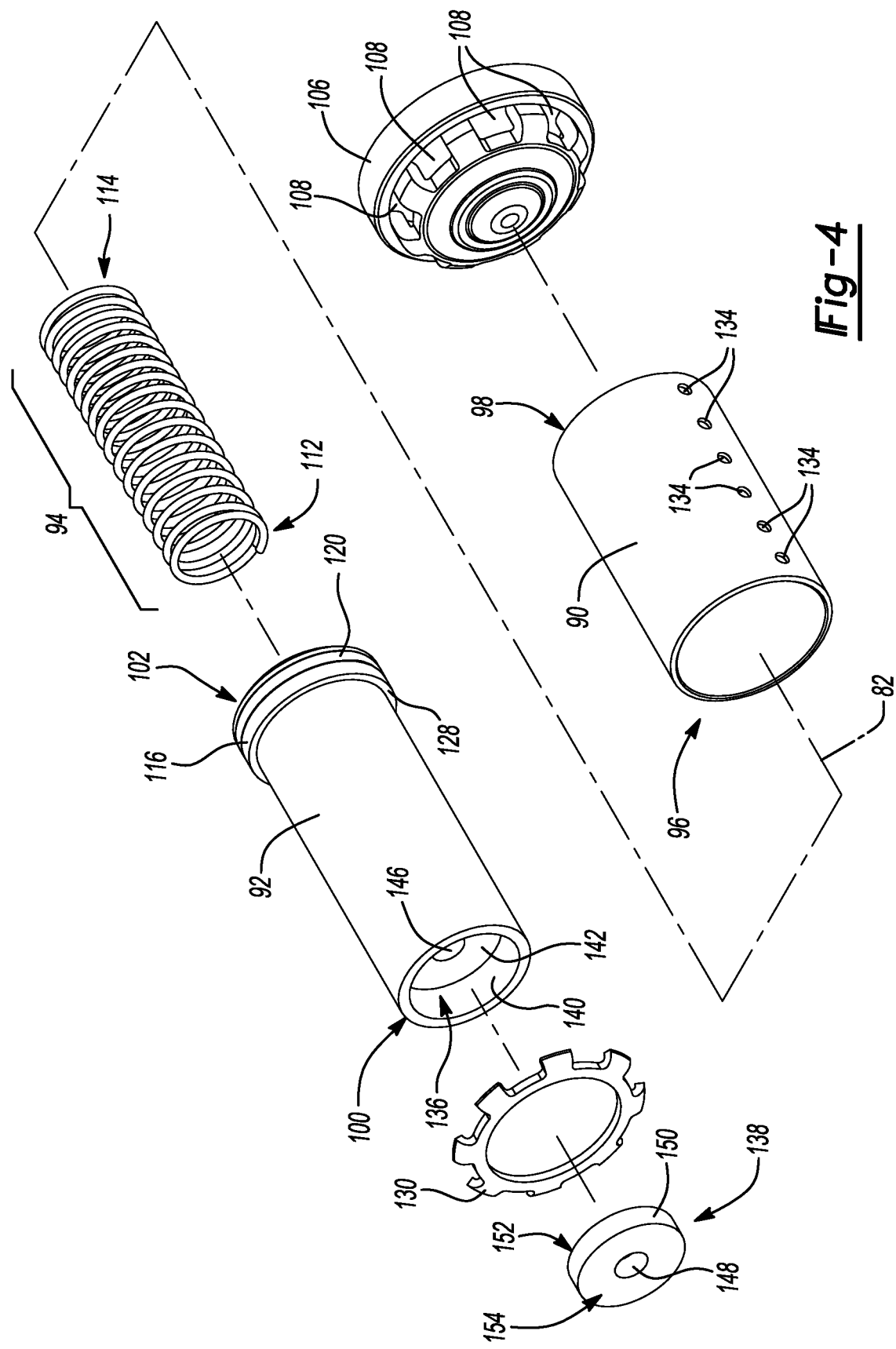
FIG. 4 is an exploded perspective view of the hydraulic compression stop assembly of the exemplary damper illustrated in FIG. 1.

With additional reference to FIGS. 2-4, the damper 20 includes a hydraulic compression stop assembly 88 positioned inside the second working chamber 48. The hydraulic compression stop assembly 88 includes a sleeve 90, a plunger 92, and a biasing member 94. The plunger 92 is arranged in sliding engagement with the sleeve 90 and can therefore move (i.e., slide) between an extended position and a retracted position. The biasing member 94 biases the plunger 92 towards the extended position.

The sleeve 90 of the hydraulic compression stop assembly 88 is positioned inside the second pressure tube end 86. The sleeve 90 extends longitudinally between a first sleeve end 96 and a second sleeve end 98. The second sleeve end 98 is positioned adjacent to the second pressure tube end 86, while the first sleeve end 96 is positioned closer to the piston 32. The plunger 92 of the hydraulic compression stop assembly 88 extends longitudinally between a first plunger end 100 and a second plunger end 102. The first plunger end 100 is configured to contact the piston 32, second piston rod end 37, and/or nut 66 during a compression stroke. The second plunger end 102 is arranged in sliding engagement inside the sleeve 90. The plunger 92 also includes a spring cavity 104 that is open at the second plunger end 102. The biasing member 94 of the hydraulic compression stop assembly 88 extends into the spring cavity 104 of the plunger 92 and applies a biasing force to the plunger 92, which biases the plunger 92 towards the extended position (i.e., towards the piston 32). Although other configurations are possible, in the illustrated embodiment, the biasing member 94 is a coil spring.

The hydraulic compression stop assembly 88 includes a base adapter 106 that is fixedly attached to the second sleeve end 98. For example, the base adapter 106 may be welded to the second sleeve end 98. A portion of the base adapter 106 is press-fit into the second pressure tube end 86, which holds the hydraulic compression stop assembly 88 in place inside the second working chamber 48. A portion of the base valve assembly 38 is received in the base adapter 106. The base adapter 106 includes a plurality of bypass openings 108, which allow fluid to flow freely between the second working chamber 48 and the base valve assembly 38.

Together, the sleeve 90, the spring cavity 104 in the plunger 92, and the base adapter 106 cooperate to define a hydraulic chamber 110 inside the hydraulic compression stop assembly 88. The biasing member 94 is positioned inside the hydraulic chamber 110 and extends longitudinally between a first biasing member end 112 and a second biasing member end 114. The first biasing member end 112 is positioned inside the spring cavity 104 and is arranged in contact with the plunger 92, while the second biasing member end 114 is arranged in contact with the base adapter 106. The spring cavity 104 in the plunger 92 allows a longer, stiffer spring to be used for the biasing member 94 and prevents the biasing member 94 from compressing to its dead-length when the plunger 92 reaches the retracted position. This reduces shear stress in the spring. In the illustrated example, the spring cavity 104 has a frustoconical shape that opens gradually with an increasing diameter moving towards the second plunger end 102 such that the biasing member 94 does not become constrained within (i.e., does not bind in) the spring cavity 104 when the plunger 92 moves to the retracted position.

Figure 5:
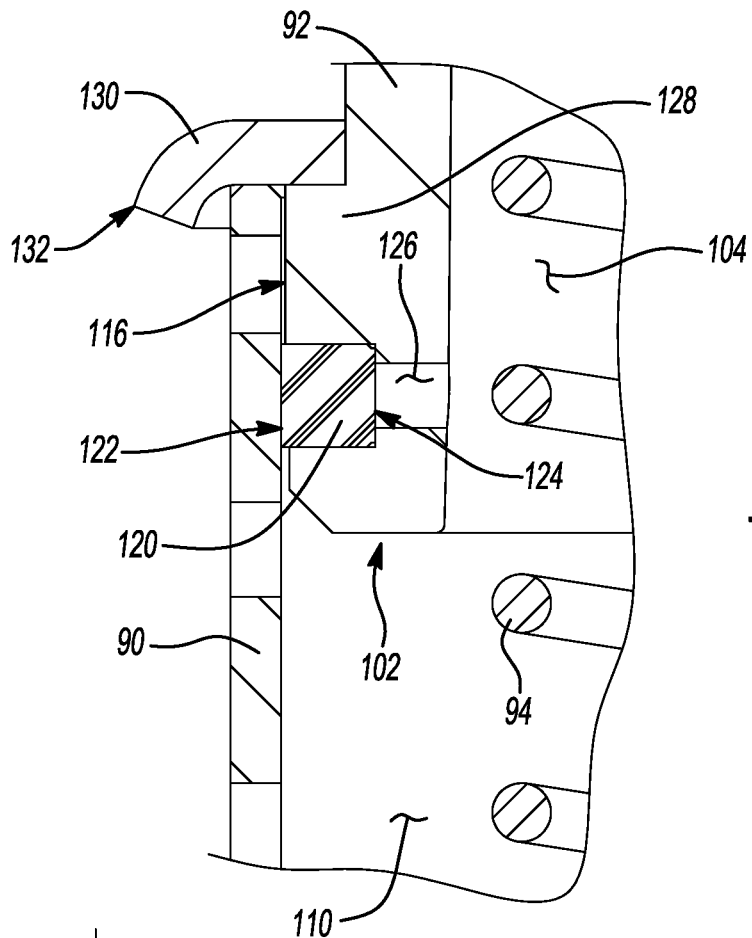
FIG. 5 is an enlarged side cross-sectional view of a portion of the hydraulic compression stop assembly illustrated in FIG. 3.

As best seen in FIG. 5, the second plunger end 102 includes a sealing surface 116 that is arranged in sliding contact with the sleeve 90. An annular channel 118 is provided in the sealing surface 116 in the form of an annular groove. The annular channel 118 receives a sealing ring 120, which includes an outside surface 122 that is arranged in contact with the inside of the sleeve 90 and an inside surface 124 that faces the spring cavity 104. One or more holes 126 extend through the second sleeve end 98 and radially between the annular channel 118 and the spring cavity 104. As a result, fluid pressure in the hydraulic chamber 110 of the hydraulic compression stop assembly 88 operates to push radially outwardly against the inside surface 124 of the sealing ring 120, which presses and holds the outside surface 122 of the sealing ring 120 against the sleeve 90.

Again referring to FIGS. 2-5, the sealing surface 116 of the plunger 92 is defined by a plunger flange 128 that extends annularly about the second plunger end 102. A top hat 130 is fixedly attached to the first sleeve end 96. By way of example and without limitation, the top hat 130 may be welded to the first sleeve end 96. The top hat 130 extends radially inwardly from the first sleeve end 96. As a result, the top hat 130 and the plunger flange 128 come into contact with one another in an interleaving arrangement when the plunger 92 is in the extended position. Accordingly, the top hat 130 acts as a travel stop for the plunger 92. The top hat 130 is placed at a location where the biasing member 94 is kept under a positive preload when the plunger 92 reaches the extended position. In other words, the biasing member 94 remains partially compressed even when the plunger 92 is in the extended position and will never reach its uncompressed, natural length after the top hat 130 is welded in place.

Optionally, the top hat 130 may also extend radially outwardly from the first sleeve end 96 towards the pressure tube 30. In accordance with this arrangement, an outer circumference 132 of the top hat 130 will contact the pressure tube 30 if the hydraulic compression stop assembly 88 begins to tilt inside the pressure tube 30. As a result, the top hat 130 defines a hydraulic compression stop assembly tilt limit that helps maintain the hydraulic compression stop assembly 88 in a substantially centered orientation within the pressure tube 30.

The sleeve 90 of the hydraulic compression stop assembly 88 may also include a plurality of orifices 134 that are spaced longitudinally apart from one another such that the number of the orifices 134 that communicate fluid between the hydraulic chamber 110 and the second working chamber 48 decreases when the plunger 92 moves from the extended position to the retracted position. This occurs as the sealing surface 116 of the plunger 92 slides past the orifices 134 leaving fewer and fewer orifices 134 in fluid communication with the hydraulic chamber 110 as the plunger 92 approaches the retracted position. The decrease in the number of orifices 134 available to communicate fluid from the hydraulic chamber 110 to the second working chamber 48, increases the flow restriction, and creates a progressive increase in damping force as the plunger 92 approaches the retracted position. If a progressive damping increase is not necessary or desired, the orifices 134 can be moved to alternative locations in the sleeve 90, base adapter 106, plunger 92, and/or top hat 130.

The hydraulic compression stop assembly 88 described herein reduces the end stop loads transferred to the vehicle body for improved ride comfort by hydraulically generating an additional damping force at the end of compression strokes of the damper 20. Advantageously, the particular configuration of the hydraulic compression stop assembly 88 described herein can be constructed at a low cost and can be installed in conventional, passive dampers without requiring significant changes or modifications to the structure of the damper or to manufacturing and assembly processes. The welding of the top hat 130 to the first sleeve end 96 and the base adapter 106 to the second sleeve end 98 can be performed in an off-line manufacturing process where the hydraulic compression stop assembly 88 is constructed separately from the damper 20. The pre-assembled hydraulic compression stop assembly 88 can then be press-fit into the second pressure tube end 86 during assembly of the damper 20 on an assembly line. This ability to weld the hydraulic compression stop assembly 88 off-line decreases manufacturing costs. Because welding operations of the hydraulic compression stop assembly 88 can be performed off-line, capacitive discharge (CD) welding can be used to further reduce manufacturing costs.

Figure 6:
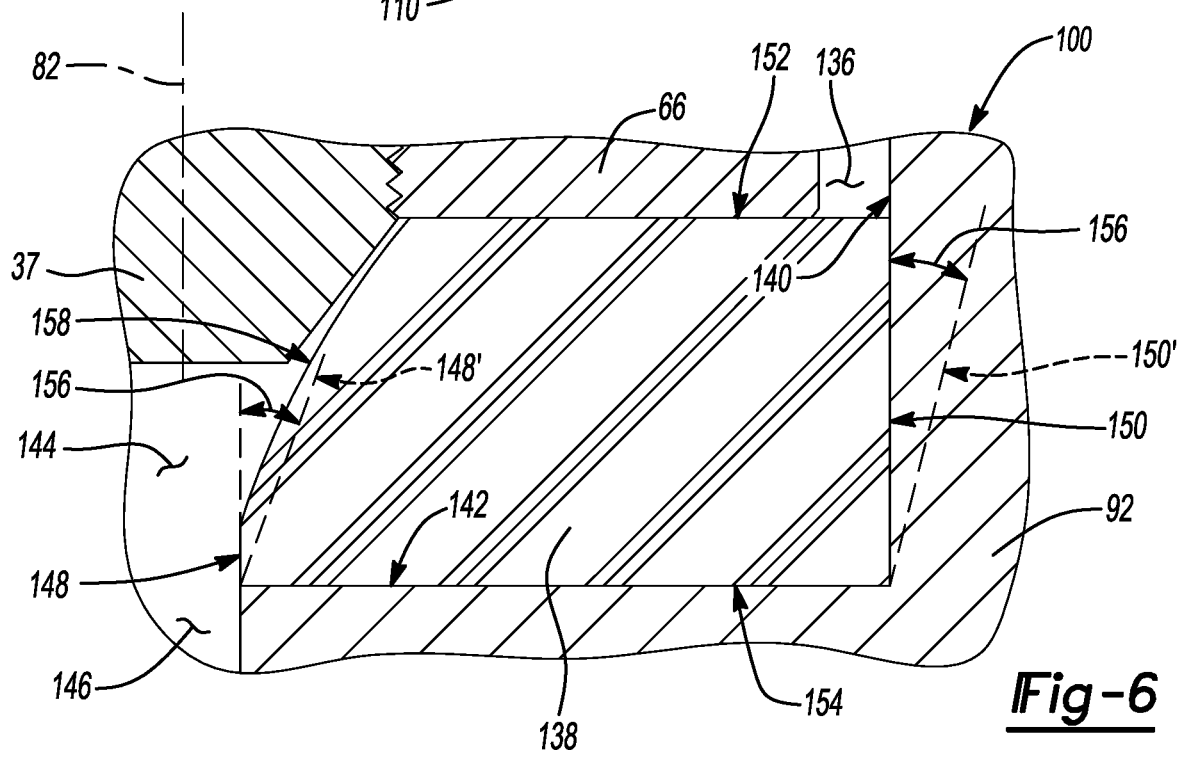
FIG. 6 is an enlarged side cross-sectional view of a portion of the exemplary damper illustrated in FIG. 1.
Figure 7:
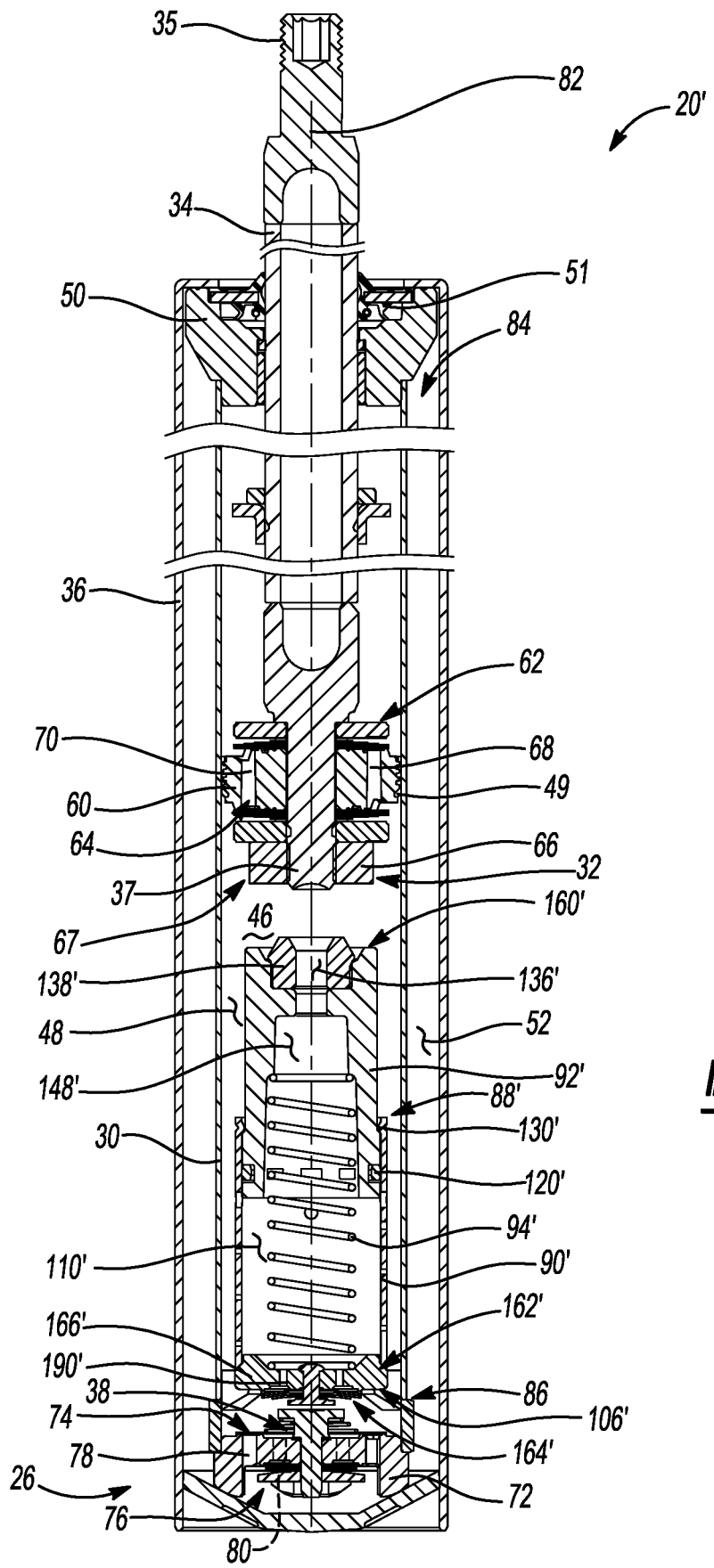
FIG. 7 is a side cross-sectional view of an exemplary damper with another exemplary hydraulic compression stop assembly that has been constructed in accordance with the teachings of the present disclosure.
Figure 8:
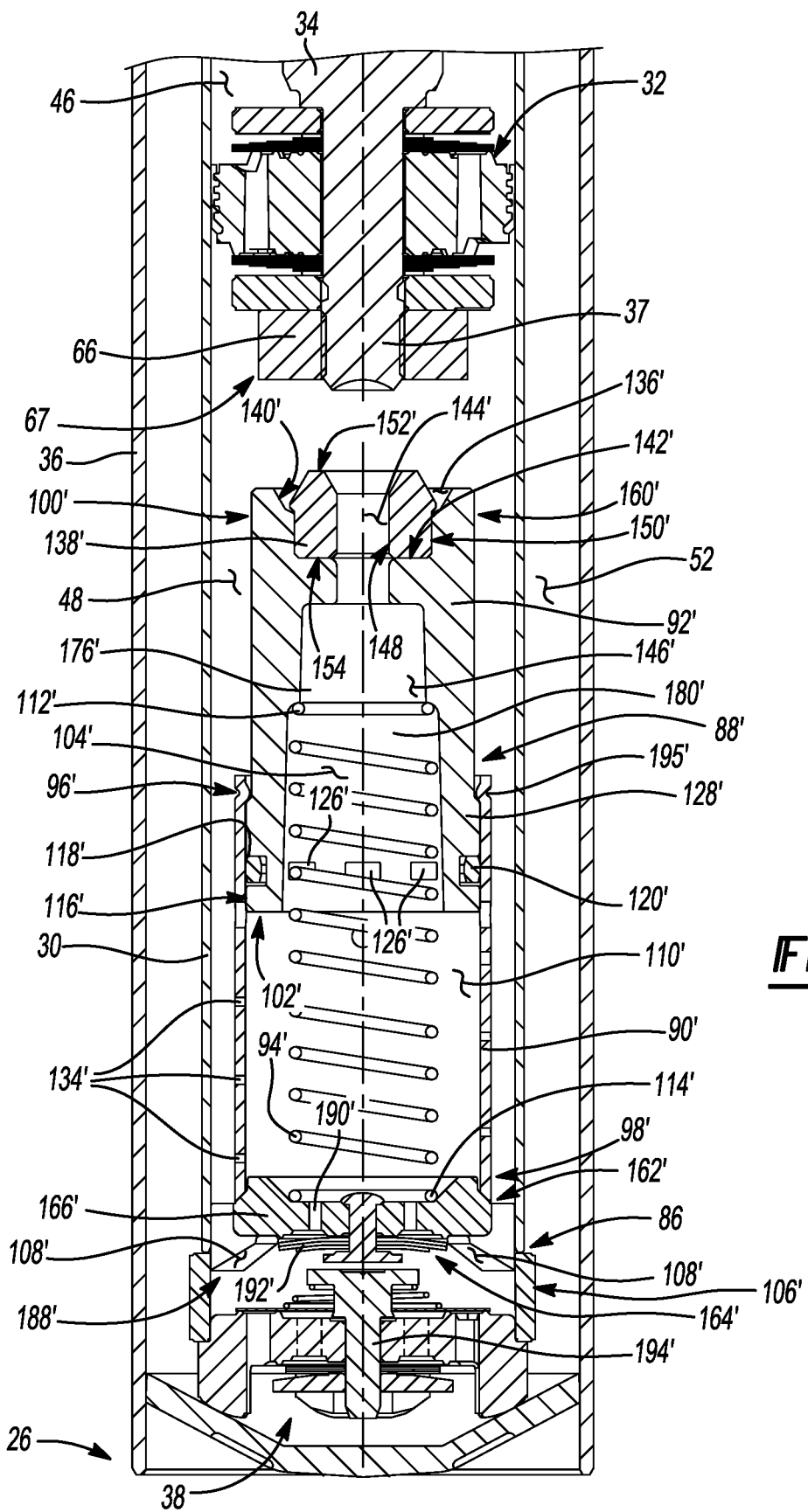
FIG. 8 is an enlarged side cross-sectional view of a portion of the exemplary damper illustrated in FIG. 7.

With additional reference to FIG. 6, the first plunger end 100 includes a bumper cavity 136. The bumper cavity 136 in the first plunger end 100 receives a bumper 138 that is made of a compliant material. For example and without limitation, the bumper 138 may be made of an elastomeric material. The bumper cavity 136 includes a side wall 140 and an end wall 142. The bumper 138 has a ring-like shape and includes a central bore 144 that is arranged in fluid communication with an intake passageway 146 that extends longitudinally through the plunger 92 between the bumper cavity 136 and the spring cavity 104.

The bumper 138 has an inner circumferential surface 148, an outer circumferential surface 150, a first abutment surface 152, and a second abutment surface 154. The first abutment surface 152 of the bumper 138 is configured to come into contact with and seal against the piston 32, second piston rod end 37, and/or nut 66 when the damper 20 approaches the end of a compression stroke. The second abutment surface 154 of the bumper 138 is arranged in contact with the end wall 142 of the bumper cavity 136. Normally, fluid can freely flow between the second working chamber 48 and the hydraulic chamber 110 of the hydraulic compression stop assembly 88 via the central bore 144 in the bumper 138 and the intake passageway 146 in the plunger 92. However, contact between the first abutment surface 152 of the bumper 138 and the piston 32, second piston rod end 37, and/or nut 66 during a compression stroke closes off the central bore 144 in the bumper 138 and therefore the intake passageway 146 in the plunger 92. As a result, the only flow path through which fluid in the hydraulic chamber 110 can flow when the piston 32, second piston rod end 37, and/or nut 66 is in contact with the hydraulic compression stop assembly 88 during a compression stroke is through the open orifices 134 in the sleeve 90. The bumper 138 cushions the impact of the piston 32, second piston rod end 37, and/or nut 66 on the first plunger end 100 and therefore provides improved noise, vibration, and harshness (NVH) performance.

Still referring to FIG. 6, the outer circumferential surface 150 of the bumper 138 abuts the side wall 140 of the bumper cavity 136. The outer circumferential surface 150 of the bumper 138 is arranged at a non-parallel angle 156 relative to the side wall 140 of the bumper cavity 136 when the bumper 138 is in an uncompressed state (i.e., before the bumper 138 is pressed into the bumper cavity 136). Although other configurations may be possible, the non-parallel angle 156 may be in the range of a 2 to 10 degree difference between the angle 156 of the outer circumferential surface 150 of the bumper 138 and the side wall 140 of the bumper cavity 136 relative to the damper axis 82. Because there is a difference between the angle 156 of the outer circumferential surface 150 of the bumper 138 and the side wall 140 of the bumper cavity 136 relative to the damper axis 82, radial compression in the compliant material of the bumper 138 occurs when the bumper 138 is pressed into the bumper cavity 136, which creates an interference fit between the outer circumferential surface 150 of the bumper 138 and the side wall 140 of the bumper cavity 136. This geometry helps retain the bumper 138 in the bumper cavity 136 during operation of the damper 20. Absent this geometry, the bumper 138 could lift out of the bumper cavity 136 during rebound strokes as a result of fluid flow inside the damper 20 and/or where the bumper 138 tries to stick to the piston 32, second piston rod end 37, and/or nut 66, particularly during cold operating conditions. Line 148' illustrates the inner circumferential surface and line 150' illustrates the outer circumferential surface of the bumper 138 in an uncompressed state.

In the illustrated example, the side wall 140 of the bumper cavity 136 is parallel to the damper axis 82 and the outer circumferential surface 150 of the bumper 138 is arranged at an angle 156 ranging from 2 to 10 degrees relative to the damper axis 82. In other words, in FIG. 6, the side wall 140 of the bumper cavity 136 has a cylindrical shape and the bumper 138, in an uncompressed state, has a frusto-conical (i.e., tapered) shape with an outer diameter that gradually decreases moving from the first abutment surface 152 to the second abutment surface 154. In addition, the inner circumferential surface 148 of the bumper 138 may be arranged at the same non-parallel angle 156 as the outer circumferential surface 150 to adjust for geometric distortions caused by the radial compression of the compliant material of the bumper 138 when the bumper 138 is pressed into the bumper cavity 136. This helps orient the inner circumferential surface 148 of the bumper 138 at a substantially parallel orientation to the damper axis 82 after the radial compression occurs. Absent this feature, the inner circumferential surface 148 of the bumper 138 could shift and reduce the diameter of the central bore 144 after the bumper 138 is pressed into the bumper cavity 136, ultimately restricting the fluid flow through the intake passageway 146.

Optionally, the bumper 138 may also include a tapered surface 158 extending between the inner circumferential surface 148 and the first abutment surface 152, which may be configured to be spaced away from the second piston rod end 37 when the piston 32 and/or nut 66 is arranged in contact with the first abutment surface 152 of the bumper 138. The diameter of the nut 66 may also be increased over those used in a conventional damper to provide more contact surface area between the nut 66 and the first abutment surface 152 of the bumper 138.

While not shown, it should also be appreciated that an alternative arrangement is possible where the outer circumferential surface 150 of the bumper 138 is parallel to the damper axis 82 and the side wall 140 of the bumper cavity 136 is arranged at an angle 156 ranging from 2 to 10 degrees relative to the damper axis 82. In other words, an alternative arrangement is possible where the outer circumferential surface 150 of the bumper 138, in an uncompressed state, has a cylindrical shape and the side wall 140 of the bumper cavity 136 has an inner diameter that gradually decreases moving from the end wall 142 of the bumper cavity 136 to the first plunger end 100.

FIGS. 7-11 illustrate another exemplary damper 20', with a hydraulic compression stop assembly 88' of an alternative configuration. Many of the elements of the damper 20' shown in FIGS. 7-11 are the same as the elements of the damper 20 shown in FIGS. 1-6 and therefore share the same reference numbers. The elements in FIGS. 7-11 that are new, different, or have been modified are labeled with reference numbers where a prime (') annotation has been appended after the reference numeral.

Like in the previously described embodiment, the damper 20' illustrated in FIGS. 7-11 includes a pressure tube 30, piston 32 arranged in sliding engagement inside the pressure tube 30, and piston rod 34 coupled to the piston 32. Although other configurations are possible, in the illustrated example, a nut 66 fixedly couples the piston 32 to the piston rod 34 such that the piston 32, piston rod 34, and nut 66 form a piston rod assembly 67. The pressure tube 30 extends longitudinally between a first pressure tube end 84 and a second pressure tube end 86. The piston 32 divides the pressure tube 30 into a first working chamber 46 positioned between the piston 32 and the first pressure tube end 84 and a second working chamber 48 positioned between the piston 32 and the second pressure tube end 86. A reserve tube 36 extends annularly about the pressure tube 30 to define a reservoir chamber 52 that is positioned radially between the reserve tube 36 and the pressure tube 30.

The hydraulic compression stop assembly 88' is positioned in the second working chamber 48 and extends longitudinally between a first assembly end 160' and a second assembly end 162'. The second assembly end 162' is positioned closer to the second pressure tube end 86 than the first assembly end 160'. The hydraulic compression stop assembly 88' illustrated in FIGS. 7-11 includes a sleeve 90', a plunger 92', a biasing member 94', a base adapter 106', and a pressure relief valve 164'.

Like in the previously described embodiment, the plunger 92' is arranged in sliding engagement with the sleeve 90' for movement between an extended position and a retracted position. The plunger 92' extends longitudinally between a first plunger end 100' and a second plunger end 102'. The first plunger end 100' is configured to contact the piston 32 and/or the piston rod 34 during a compression stroke and the second plunger end 102' is arranged in sliding engagement inside the sleeve 90'. The sleeve 90' has a tubular shape and extends longitudinally between a first sleeve end 96' and a second sleeve end 98'.

The base adapter 106' is fixedly attached to the second sleeve end 98' and includes a base adapter wall 166'. Together, the sleeve 90', plunger 92', and base adapter wall 166' cooperate to define a hydraulic chamber 110' inside the hydraulic compression stop assembly 88'. The base adapter wall 166' includes a first surface 168' that faces the hydraulic chamber 110' of the hydraulic compression stop assembly 88' and a second surface 170' opposite the first surface 168'. Bypass openings 108' extend through the base adapter wall 166'. The base adapter 106' further includes a first shoulder 172' that is fixedly attached to the second sleeve end 98' and a second shoulder 174' that is sized to mate with the second pressure tube end 86 in a press fit. By way of example and without limitation, the first shoulder 172' of the base adapter 106' may be welded to the second sleeve end 98'.

The biasing member 94' biases (i.e., pushes) the plunger 92' towards the extended position, where the plunger 92' is positioned further from the second pressure tube end 86 than it is in the retracted position. The biasing member 94' extends longitudinally between a first biasing member end 112' and a second biasing member end 114'. The biasing member 94' is positioned inside the hydraulic chamber 110' such that the second biasing member end 114' is arranged in contact with the base adapter wall 166'.

The plunger 92' includes a spring cavity 104' that receives the first biasing member end 112'. Although other shapes are possible, in the example illustrated in FIGS. 7-11, the spring cavity 104' includes a first cavity portion 176' that has a first diameter 178' and a second cavity portion 180' that has a second diameter 182' that is larger than the first diameter 178'. The second cavity portion 180' is positioned at the second plunger end 102' and receives the first biasing member end 112'.

The plunger 92' includes an intake passageway 146' that extends through the first plunger end 100'. The intake passageway 146' is constructed to openly communicate fluid between the second working chamber 48 and the hydraulic chamber 110' inside said hydraulic compression stop assembly 88' except when the piston rod assembly 67 (i.e., the piston 32, piston rod 34, and/or nut 66) come into contact with the first plunger end 100', thereby closing off the intake passageway 146'.

The sleeve 90' of the hydraulic compression stop assembly 88' may include a plurality of orifices 134' that are spaced longitudinally apart from one another such that the number of the orifices 134' that communicate fluid between the hydraulic chamber 110' and the second working chamber 48 decreases when the plunger 92' moves from the extended position to the retracted position. As previously explained, the decrease in the number of orifices 134' available to communicate fluid from the hydraulic chamber 110' to the second working chamber 48, increases the flow restriction, and creates a progressive increase in damping force as the plunger 92' approaches the retracted position.

Figure 9:
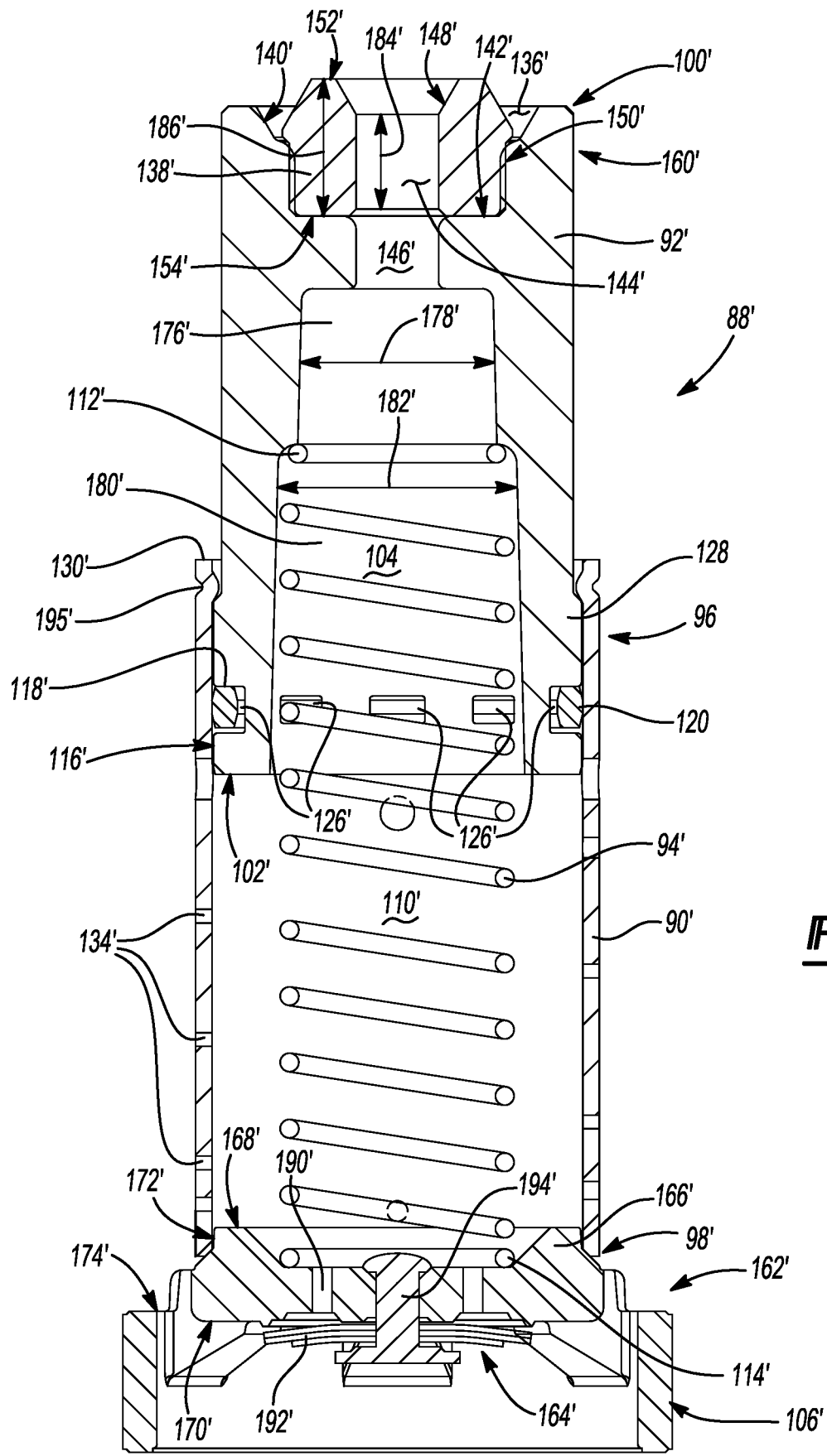
FIG. 9 is an enlarged side cross-sectional view of the exemplary hydraulic compression stop assembly illustrated in FIG. 7.
Figure 10:
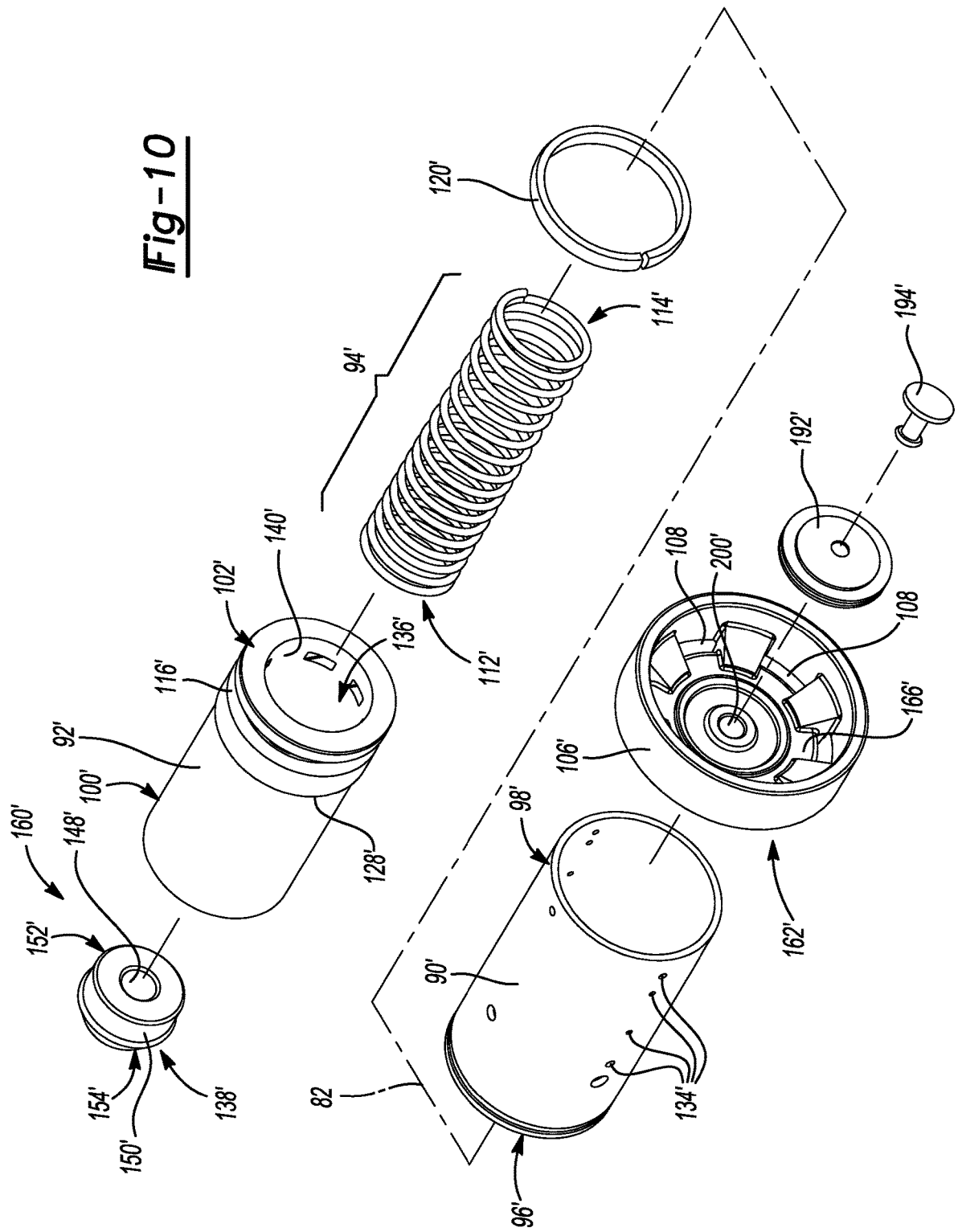
FIG. 10 is an exploded perspective view of the exemplary hydraulic compression stop assembly illustrated in FIG. 7.

The first plunger end 100' includes a bumper cavity 136' that receives a bumper 138' that is made of a resilient material. The bumper 138' has a central bore 144' that is arranged in fluid communication with the intake passageway 146' of the plunger 92'. As shown in FIG. 9, the bumper cavity 136' has a cavity depth 184' and the bumper 138' has a bumper height 186'. Although other configurations are possible, the geometry of the bumper cavity 136' and the bumper 138' may be selected such that the bumper height 186' is greater than the cavity depth 184' to limit the maximum amount the bumper 138' can be compressed before the side wall 140' of the bumper cavity 136' takes the impact load of the piston rod assembly 67 (i.e., the piston 32, piston rod 34, and/or nut 66) at the end of a compression stroke. It should be appreciated that in accordance with such an arrangement, only a portion of the bumper 138' protrudes from the bumper cavity 136'.

The damper 20' includes a base valve assembly 38 that is positioned at the second pressure tube end 86. At least part of the base valve assembly 38 is received in the base adapter 106'. Thus, an intermediate chamber 188' is created that is positioned longitudinally between the base valve assembly 38 and the base adapter wall 166. This intermediate chamber 188' is disposed in fluid communication with the second working chamber 48 via the bypass openings 108'. The base valve assembly 38 is arranged to control fluid flow between the intermediate chamber 188' and the reservoir chamber 52 that compensates for changes in the volume of fluid displaced by the piston rod 34 (i.e., rod volume) during compression and rebound strokes.

The base adapter 106' includes one or more pressure relief passageway 190' that extend through the base adapter wall 166' from the hydraulic chamber 110' to the intermediate chamber 188'. The pressure relief valve 164' is located at the second assembly end 162' of the hydraulic compression stop assembly 88' and is positioned to open and close the pressure relief passageway(s) 190'. The pressure relief valve 164' in the illustrate examples is a passive valve that is constructed such that the pressure relief passageway(s) 190' communicate fluid from the hydraulic chamber 110' to the intermediate chamber 188' and thus the second working chamber 48 when fluid pressure inside the hydraulic chamber 110' exceeds a pre-determined threshold pressure. This pre-determined threshold pressure can be tuned based on vehicle specific requirements, the type of impacts the hydraulic compression stop assembly 88' is designed to attenuate, and the geometry and strength of the hydraulic compression stop assembly 88'.

In the example illustrated in FIGS. 7-11, the pressure relief valve 164' includes a spring-disc stack 192' that is arranged in abutting contact with the second surface 170' of the base adapter wall 166'. Although other configurations are possible, in the illustrated embodiment, a rivet 194' holds the center of the spring-disc stack 192' against the second surface 170' of the base adapter wall 166'. The spring-disc stack 192' flexes away from the second surface 170' of the base adapter wall 166' at its periphery to open the pressure relief passageway(s) 190' when the fluid pressure in the hydraulic chamber 110' of the hydraulic compression stop assembly 88' exceeds the predetermined threshold pressure. The pressure relief valve 164' therefore helps prevent damage to the hydraulic compression stop assembly 88' due to excessive internal pressure in the hydraulic chamber 110'. Such a condition can occur during high rod speed events because the fluid pressure inside the hydraulic chamber 110' continuously increases with the fluid flow rate squared. By limiting the peak pressure inside the hydraulic chamber 110' of the hydraulic compression stop assembly 88', the addition of the pressure relief valve 164' allows the hydraulic compression stop assembly 88' to be tuned to improve ride performance and quality during low and moderate rod speed events while not breaking during high rod speed events. The pressure relief valve 164' also allows for certain components of the hydraulic compression stop assembly 88' to be more economically made. For example, the plunger 92', sleeve 90', and base adapter 106' may be made from relatively thin-walled plastic materials without risk of structural failure.

Figure 11:
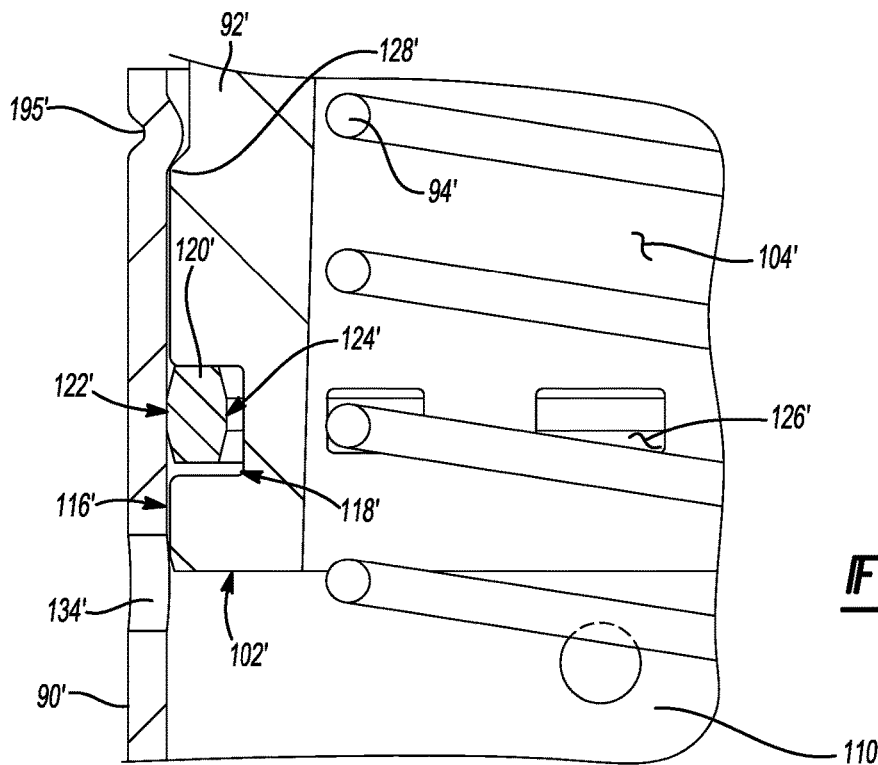
FIG. 11 is an enlarged side cross-sectional view of a portion of the exemplary hydraulic compression stop assembly illustrated in FIG. 7.

As best seen in FIG. 11, the second plunger end 102' includes a bearing surface 116' that is arranged in sliding contact with the sleeve 90'. The bearing surface 116' of the plunger 92' is defined by a plunger flange 128' that extends annularly about the second plunger end 102'. The first sleeve end 96' includes one or more indentations 195' that may be formed by crimping or other manufacturing operations. The indentation(s) 195' come into contact with the plunger flange 128' when the plunger 92' is in the extended position and therefore act as a travel stop that retains the second plunger end 102' in the sleeve 90'. Optionally, the indentation(s) 195' may be placed at locations where the biasing member 94' is kept under a positive preload when the plunger 92' reaches the extended position. In such an arrangement, the biasing member 94' remains partially compressed even when the plunger 92' is in the extended position and will never reach its uncompressed, natural length after final assembly.

An annular channel 118' is provided in the bearing surface 116' in the form of an annular groove. The annular channel 118' receives a sealing ring 120', which includes an outside surface 122' that is arranged in contact with the inside of the sleeve 90' and an inside surface 124' that faces the spring cavity 104'. One or more holes 126' extend through the second sleeve end 98' and radially between the annular channel 118' and the spring cavity 104'. The hydraulic chamber 110' of the hydraulic compression stop assembly 88' is arranged in fluid communication with the spring cavity 104', so fluid pressure operates to push radially outwardly against the inside surface 124' of the sealing ring 120', which presses and holds the outside surface 122' of the sealing ring 120' against the sleeve 90'.

Figure 12:
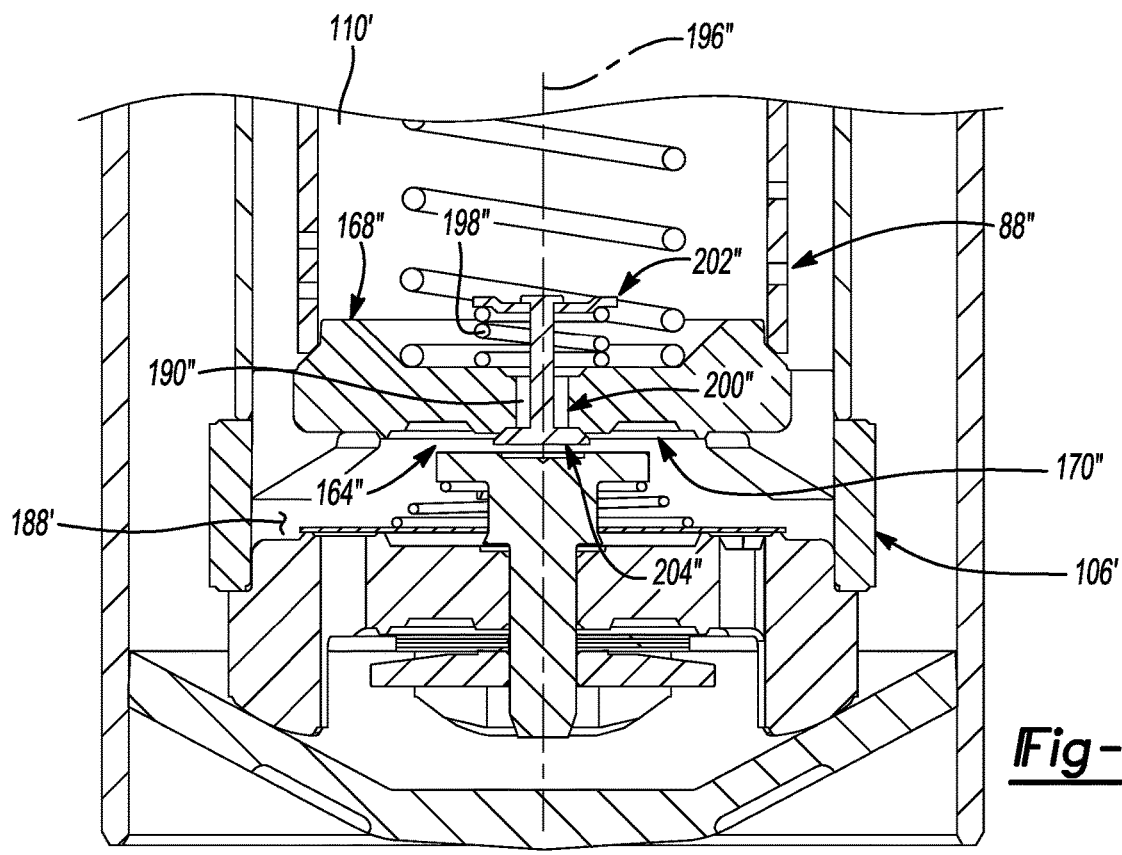
FIG. 12 is an enlarged side cross-sectional view of a portion of another exemplary hydraulic compression stop assembly that has been constructed in accordance with the teachings of the present disclosure.

FIG. 12 illustrates another exemplary hydraulic compression stop assembly 88" with a pressure relief valve 164" of an alternative configuration. Many of the elements of the hydraulic compression stop assembly 88" shown in FIG. 12 are the same as the elements of the hydraulic compression stop assembly 88' shown in FIGS. 7-11 and therefore share the same reference numbers. The elements in FIG. 12 that are new, different, or have been modified are labeled with reference numbers where a prime (') annotation has been appended after the reference numeral.

The pressure relief valve 164" illustrated in FIG. 12 includes a poppet 196" and a spring 198". The poppet 196" extends longitudinally through a hole 200" in the base adapter wall 166" in a clearance fit such that the poppet 196" can slide longitudinally relative to the base adapter wall 166". The poppet 196" includes a first poppet end 202" that is positioned in the hydraulic chamber 110' and a second poppet end 204", opposite the first poppet end 202", that is positioned in the intermediate chamber 188'. The spring 198" is positioned longitudinally between the first poppet end 202" and a first surface 168" of the base adapter wall 166" such that the spring 198" holds the second poppet end 204" in abutting contact with a second surface 170" of the base adapter wall 166" until fluid pressure in the hydraulic chamber 110' of the hydraulic compression stop assembly 88" exceeds a predetermined threshold pressure that corresponds with a biasing force of the spring 198". When the fluid pressure in the hydraulic chamber 110' of the hydraulic compression stop assembly 88" exceeds the predetermined threshold pressure, the second poppet end 204" moves away from the second surface 170" of the base adapter wall 166" to open one or more pressure relief passageways 190" that extend through the base adapter wall 166", which operates to relieve (i.e., reduce/bleed out) the fluid pressure in the hydraulic chamber 110'. As shown in the illustrated embodiment, the hole 200" may form the pressure relief passageway 190" in some configurations.

Many other modifications and variations of the present disclosure are possible in light of the above teachings and may be practiced otherwise than as specifically described while within the scope of the appended claims.

What is claimed is:

1. A damper comprising:
a pressure tube extending longitudinally between a first pressure tube end and a second pressure tube end;
a piston arranged in sliding engagement inside said pressure tube;
said piston dividing said pressure tube into a first working chamber and a second working chamber;
a piston rod coupled to said piston to form a piston rod assembly; and
a hydraulic compression stop assembly positioned in said second working chamber, said hydraulic compression stop assembly including a sleeve, a plunger arranged in sliding engagement with said sleeve for movement between an extended position and a retracted position, a pressure relief valve, and a biasing member that biases said plunger towards said extended position;
said sleeve, said plunger, and said pressure relief valve cooperating to define a hydraulic chamber inside said hydraulic compression stop assembly;
said hydraulic compression stop assembly extending longitudinally between a first assembly end and a second assembly end that is positioned closer to said second pressure tube end than said first assembly end;

said plunger extending longitudinally between a first plunger end that is configured to contact at least one of said piston and said piston rod during a compression stroke and a second plunger end that is arranged in sliding engagement inside said sleeve, said pressure relief valve being located at said second assembly end that is positioned to open and close at least one pressure relief passageway that is constructed to communicate fluid from said hydraulic chamber inside said hydraulic compression stop assembly to said second working chamber when fluid pressure inside said hydraulic chamber exceeds a pre-determined threshold pressure.

2. The damper as set forth in claim 1, wherein a base adapter is fixedly attached to said second sleeve end and includes a base adapter wall, said pressure relief passageway extends through said base adapter wall, and said pressure relief valve is mounted to said base adapter wall.

3. The damper as set forth in claim 2, wherein said base adapter wall includes a first surface that faces said hydraulic chamber of said hydraulic compression stop assembly and a second surface opposite said first surface.

4. The damper as set forth in claim 3, wherein said pressure relief valve includes a spring-disc stack, abutting said second surface of said base adapter wall, that flexes away from said second surface of said base adapter wall to open said at least one pressure relief passageway when said fluid pressure in said hydraulic chamber of said hydraulic compression stop assembly exceeds said predetermined threshold pressure.

5. The damper as set forth in claim 3, wherein said pressure relief valve includes a poppet and a spring, said poppet extends longitudinally through a hole in said base adapter wall between a first poppet end positioned in hydraulic chamber and a second poppet end opposite said first poppet end, said spring is positioned longitudinally between said first poppet end and said first surface of said base adapter wall such that said spring holds said second poppet end in abutting contact with said second surface of said base adapter wall until said fluid pressure in said hydraulic chamber of said hydraulic compression stop assembly exceeds said predetermined threshold pressure at which time said second poppet end moves away from said second surface of said base adapter wall to open said at least one pressure relief passageway.

6. The damper as set forth in claim 1, wherein said plunger includes an intake passageway that extends through said first plunger end, wherein said intake passageway is constructed to openly communicate fluid between said second working chamber and said hydraulic chamber inside said hydraulic compression stop assembly except when said piston rod assembly comes into contact with said first plunger end to close off said intake passageway.

7. The damper as set forth in claim 6, wherein said first plunger end includes a bumper cavity that receives a bumper made of a resilient material and, said bumper having a central bore arranged in fluid communication with said intake passageway of said plunger.

8. The damper as set forth in claim 7, wherein said bumper cavity has a cavity depth and said bumper has a bumper height that is greater than said cavity depth such that a portion of said bumper protrudes from said bumper cavity and is configured to contact said piston rod assembly during a compression stroke.

9. The damper as set forth in claim 1, wherein said pressure relief valve is a passive valve that is configured to open and permit fluid flow from said hydraulic chamber of said hydraulic compression stop assembly to said second working chamber when said fluid pressure inside said hydraulic chamber exceeds said pre-determined threshold pressure.

10. A damper comprising:
a pressure tube extending annularly about a damper axis;
a piston arranged in sliding engagement inside said pressure tube;
said piston dividing said pressure tube into a first working chamber and a second working chamber;
a piston rod coupled to said piston;
a hydraulic compression stop assembly positioned in said second working chamber, said hydraulic compression stop assembly including a sleeve, a plunger arranged in sliding engagement with said sleeve for movement between an extended position and a retracted position, and a biasing member that biases said plunger towards said extended position;
said plunger extending longitudinally between a first plunger end that is configured to contact at least one of said piston and said piston rod during a compression stroke and a second plunger end that is arranged in sliding engagement inside said sleeve; and
said first plunger end including a bumper cavity that receives a bumper made of a compliant material, said bumper cavity including a side wall and said bumper having an outer circumferential surface that abuts said side wall of said bumper cavity, wherein said outer circumferential surface of said bumper, in an uncompressed state, is arranged at a non-parallel angle relative to said side wall of said bumper cavity to create radial compression in said compliant material of said bumper and an interference fit between said outer circumferential surface of said bumper and said side wall of said bumper cavity that operates to prevent movement of said bumper relative to said side wall of said bumper cavity during movement of said piston within said pressure tube.

11. The damper as set forth in claim 10, wherein said sleeve and said plunger cooperate to define a hydraulic chamber inside said hydraulic compression stop assembly and wherein said plunger includes an intake passageway that extends between said bumper cavity and said hydraulic compression stop assembly.

12. The damper as set forth in claim 11, wherein said bumper has a ring-like shape and includes an inner circumferential surface that is arranged at the same non-parallel angle as said outer circumferential surface to adjust for geometric distortions caused by said radial compression of said compliant material of said bumper.

13. The damper as set forth in claim 11, wherein said bumper has a central bore that is arranged in fluid communication with said intake passageway in said plunger, a first abutment surface configured to seal against at least one of said piston and said piston rod, and a second abutment surface arranged in contact with an end wall of said bumper cavity and wherein contact between at least one of said piston and said piston rod during a compression stroke closes off said central bore in said bumper and said intake passageway in said plunger.

14. The damper as set forth in claim 10, wherein said bumper includes a first abutment surface that is configured to seal against at least one of said piston and said piston rod and a second abutment surface that is arranged in contact with an end wall of said bumper cavity.

15. The damper as set forth in claim 14, wherein said side wall of said bumper cavity has a cylindrical shape and wherein said bumper, in said uncompressed state, has an outer diameter that gradually decreases moving from said first abutment surface to said second abutment surface.

16. The damper as set forth in claim 10, wherein said non-parallel angle ranges from 2 to 10 degrees.

17. A damper comprising:
a pressure tube extending longitudinally between a first pressure tube end and a second pressure tube end;
a piston arranged in sliding engagement inside said pressure tube;
said piston dividing said pressure tube into a first working chamber and a second working chamber;
a piston rod coupled to said piston to form a piston rod assembly;
a hydraulic compression stop assembly positioned in said second working chamber, said hydraulic compression stop assembly including a sleeve, a plunger arranged in sliding engagement with said sleeve for movement between an extended position and a retracted position, and a biasing member that biases said plunger towards said extended position;
said sleeve and said plunger cooperating to define a hydraulic chamber inside said hydraulic compression stop assembly;
said hydraulic compression stop assembly extending longitudinally between a first assembly end and a second assembly end that is positioned closer to said second pressure tube end than said first assembly end;
said plunger extending longitudinally between a first plunger end that is configured to contact at least one of said piston and said piston rod during a compression stroke and a second plunger end that is arranged in sliding engagement inside said sleeve;
a pressure relief valve located at said second assembly end that is positioned to open and close at least one pressure relief passageway that is constructed to communicate fluid from said hydraulic chamber inside said hydraulic compression stop assembly to said second working chamber when fluid pressure inside said hydraulic chamber exceeds a pre-determined threshold pressure; and
a base adapter is fixedly attached to said second sleeve end and includes a base adapter wall, said pressure relief passageway extends through said base adapter wall, and said pressure relief valve is mounted to said base adapter wall,
wherein said biasing member extends longitudinally between a first biasing member end and a second biasing member end and wherein said biasing member is positioned inside said hydraulic chamber such that said second biasing member end is arranged in contact with said base adapter wall.

18. The damper as set forth in claim 17, wherein said plunger includes a spring cavity that receives said first biasing member end.

19. The damper as set forth in claim 18, wherein said spring cavity includes a first cavity portion that has a first diameter and a second cavity portion that has a second diameter that is larger than said first diameter and wherein said second cavity portion is positioned at said second plunger end and receives said first biasing member end.

20. A damper comprising:
a pressure tube extending longitudinally between a first pressure tube end and a second pressure tube end;
a piston arranged in sliding engagement inside said pressure tube;
said piston dividing said pressure tube into a first working chamber and a second working chamber;
a piston rod coupled to said piston to form a piston rod assembly;
a hydraulic compression stop assembly positioned in said second working chamber, said hydraulic compression stop assembly including a sleeve, a plunger arranged in sliding engagement with said sleeve for movement between an extended position and a retracted position, and a biasing member that biases said plunger towards said extended position;
said sleeve and said plunger cooperating to define a hydraulic chamber inside said hydraulic compression stop assembly;
said hydraulic compression stop assembly extending longitudinally between a first assembly end and a second assembly end that is positioned closer to said second pressure tube end than said first assembly end;
said plunger extending longitudinally between a first plunger end that is configured to contact at least one of said piston and said piston rod during a compression stroke and a second plunger end that is arranged in sliding engagement inside said sleeve;
a pressure relief valve located at said second assembly end that is positioned to open and close at least one pressure relief passageway that is constructed to communicate fluid from said hydraulic chamber inside said hydraulic compression stop assembly to said second working chamber when fluid pressure inside said hydraulic chamber exceeds a pre-determined threshold pressure;
a base adapter is fixedly attached to said second sleeve end and includes a base adapter wall, said pressure relief passageway extends through said base adapter wall, and said pressure relief valve is mounted to said base adapter wall;
a reserve tube extending annularly about said pressure tube to define a reservoir chamber positioned radially between said reserve tube and said pressure tube; and
a base valve assembly positioned at said second pressure tube end that is arranged to control fluid flow between said second working chamber and said reservoir chamber, wherein at least part of said base valve assembly is received in said base adapter and said base adapter wall includes at least one bypass opening constructed to freely communicate fluid between said second working chamber and said base valve assembly.

* * * * *